United States Patent
Yoshihara et al.

(10) Patent No.: US 7,998,563 B2
(45) Date of Patent: Aug. 16, 2011

(54) PROTECTIVE FILM FOR POLARIZING PLATE

(75) Inventors: Masanori Yoshihara, Tokyo (JP);
Tetsuya Toyoshima, Tokyo (JP); Kohei Arakawa, Tokyo (JP)

(73) Assignee: Zeon Corporation, Tokyo (JP)

( * ) Notice: Subject to any disclaimer, the term of this patent is extended or adjusted under 35 U.S.C. 154(b) by 819 days.

(21) Appl. No.: 11/922,561

(22) PCT Filed: Jun. 21, 2006

(86) PCT No.: PCT/JP2006/312395
§ 371 (c)(1),
(2), (4) Date: Mar. 19, 2008

(87) PCT Pub. No.: WO2006/137427
PCT Pub. Date: Dec. 28, 2006

(65) Prior Publication Data
US 2009/0086320 A1    Apr. 2, 2009

(30) Foreign Application Priority Data

| Jun. 21, 2005 | (JP) | 2005-181264 |
| Jun. 21, 2005 | (JP) | 2005-181266 |
| Jun. 21, 2005 | (JP) | 2005-181267 |
| Jun. 21, 2005 | (JP) | 2005-181269 |
| Jun. 21, 2005 | (JP) | 2005-181270 |

(51) Int. Cl.
*B32B 7/00* (2006.01)
*B32B 7/02* (2006.01)
*B32B 27/08* (2006.01)
*B32B 27/30* (2006.01)

(52) U.S. Cl. ......... 428/212; 428/1.3; 428/1.33; 428/1.6; 428/500; 428/515; 428/520; 428/522; 359/490

(58) Field of Classification Search ......................... None
See application file for complete search history.

(56) References Cited

U.S. PATENT DOCUMENTS
4,925,259 A    5/1990    Emmett
(Continued)

FOREIGN PATENT DOCUMENTS
JP    2000-206303 A    7/2000
(Continued)

OTHER PUBLICATIONS
Machine generated English translation of JP-2005-115085-A having an issue date of Apr. 28, 2005.
(Continued)

*Primary Examiner* — Vivian Chen
(74) *Attorney, Agent, or Firm* — Birch, Stewart, Kolasch & Birch, LLP

(57) ABSTRACT

A protective film for polarizing plate comprising k layers (k is an integer of 2 or more) of thermoplastic resin layer laminated, wherein
a refractive index $n_i(380)$ at a wavelength of 380 nm and a refractive index $n_i(780)$ at a wavelength of 780 nm in the i th thermoplastic resin layer as well as a refractive index $n_{i+1}(380)$ at a wavelength of 380 nm and a refractive index $n_{i+1}(780)$ at a wavelength of 780 nm in the i+1 th thermoplastic resin layer have a relationship in $$||n_i(380)-n_{i+1}(380)|-|n_i(780)-n_{i+1}(780)|| \leq 0.02$$

(where, i is an integer of 1 to k−1). A polarizing plate is obtained by bonding the protective film for the polarizing plate and a polarizer. And a liquid crystal display comprising the polarizing plate and a liquid crystal panel.

12 Claims, 3 Drawing Sheets

U.S. PATENT DOCUMENTS

| | | |
|---|---|---|
| 6,361,838 B1 | 3/2002 | Miyatake et al. |
| 6,808,811 B1 | 10/2004 | Sawada et al. |
| 7,413,810 B2 * | 8/2008 | Yoshitomi et al. ............ 428/500 |
| 2006/0210767 A1 * | 9/2006 | Yoshitomi et al. ............ 428/141 |
| 2009/0237786 A1 * | 9/2009 | Yoshihara et al. ............ 359/488 |

FOREIGN PATENT DOCUMENTS

| | | |
|---|---|---|
| JP | 2001-174637 A | 6/2001 |
| JP | 2001-272535 A | 10/2001 |
| JP | 2002-249600 A | 9/2002 |
| JP | 2002-303726 A | 10/2002 |
| JP | 2003-57439 A | 2/2003 |
| JP | 2003-291236 A | 10/2003 |
| JP | 2004-345333 A | 12/2004 |
| JP | 2005-115085 A | 4/2005 |

OTHER PUBLICATIONS

Machine generated English translation of JP-2000-206303-A having an issue date of Jul. 28, 2000.

* cited by examiner

PROTECTIVE FILM FOR POLARIZING PLATE

TECHNICAL FIELD

The present invention relates to a protective film for polarizing plate, a polarizing plate and a liquid crystal display, and particularly to a protective film for polarizing plate, a polarizing plate, and a liquid crystal display in which there is no deformation by separation or the like even under an environment of high temperature and high humidity; no defective visibility due to light leakage, uneven color, coloration or the like in the vicinity of an edge of a display screen but which is excellent in scratch resistance and suitable for a liquid crystal display and the like.

BACKGROUND ART

A polarizing plate used in the liquid crystal display or the like is a laminated body comprising a polarizer and a protective film.

As the polarizer constituting the polarizing plate, used is usually a film obtained by having iodine or diachronic dye adsorbed to polyvinyl alcohol film made by a casting method and drawing the adsorbed film in a boric-acid solution.

On the other hand, as the protective film constituting the polarizing plate, triacetyl cellulose film is widely used. However, the triacetyl cellulose film is poor in moisture proof and gas barrier performance, which does not allow the polarizing plate to be sufficient in durability, heat resistance, mechanical strength and the like.

In order to improve durability and heat resistance of the polarizing film, use of a protective film other than triacetyl cellulose film is proposed. For example, in Patent Document 1, use of a laminated film comprising a norbornene resin layer and a resin layer with a small haze value as a protective film is proposed. And this protective film with the norbornene resin layer faced with a polarizer is affixed on the polarizer comprising polyvinyl alcohol to obtain a polarizing plate.

Patent Document 2 proposes a protective film with a small photoelastic coefficient in which a resin layer having hygroscopicity smaller than that of triacetyl cellulose and a positive photoelastic coefficient and a resin layer having hygroscopicity smaller than that of triacetyl cellulose and a negative photoelastic coefficient are laminated. And disclosed is a polarizing plate obtained by affixing this protective film onto a polarizer comprising polyvinyl alcohol.

[Patent Document 1] Japanese Patent Laid-Open No. 2005-115085
[Patent Document 2] Japanese Patent Laid-Open No. 2000-206303

DISCLOSURE OF THE INVENTION

Problems to be Solved by the Invention

However, using of the protective film obtained only by the prior art disclosed in Patent Document 1 or Patent Document 2 may lead a liquid crystal display or the like to bluish tinge, interference fringes, scratches by friction or the like, which makes visibility from a visible side defective. Also, when an undesirable stress is applied on the polarizing plate, light leakage, uneven coloring or the like in the vicinity of the edge of the display screen occurs, which makes visibility defective. Moreover, if the polarizing plate is left under an environment with high temperature and high humidity, deformation such as separation occurs, which also makes visibility defective.

Therefore, an object of the present invention is to provide a protective film for polarizing plate, a polarizing plate, and a liquid crystal display having no defective visibility due to light leakage, uneven rainbows, uneven color, coloring, interference fringes or the like; excellence in scratch resistance and color reproduction; and no deformation such as separation even under an environment of high temperature and high humidity; and which is suitable for a liquid crystal display and the like.

Means for Solving the Problems

As the result of examination by the inventors in order to achieve the above object, the inventors have found that by laminating a film obtained by laminating k layers of thermoplastic resin (k is an integer of 2 or more) in which refractive index $n_i(380)$ at the wavelength of 380 nm and refractive index $n_i(780)$ at the wavelength of 780 nm of the i th thermoplastic resin layer as well as refractive index $n_{i+1}(380)$ at a wavelength 380 nm and refractive index $n_{i+1}(780)$ at a wavelength 780 nm of the i+1 th thermoplastic resin layer have a specific relationship onto a polarizer, interference fringes are hard to occur but color reproductivity and the scratch resistance are excellent.

It has been found that by laminating a film in which refractive index $n_i(\lambda)$ at a wavelength $\lambda$ in the range of 380 to 780 nm of the i th thermoplastic resin layer and refractive index $n_{i+1}(\lambda)$ at a wavelength $\lambda$ in the range of 380 to 780 nm of the i+1 th thermoplastic resin layer have a specific relationship and the absolute value of photoelastic coefficient is $10 \times 10^{-12}$ $Pa^{-1}$ or less onto a polarizer, a polarizing plate with no defective visibility due to light leakage, uneven color, coloring or the like in the vicinity of an edge of a display screen but excellent in scratch resistance can be obtained.

It has been found that in a polarizing plate obtained by using a protective film in which the thermoplastic resin layers are formed by a material with haze of 0.5% or less and containing amorphous thermoplastic resin, laminated on a polarizer faced with the first thermoplastic resin layer therein, in addition, and a humidity expansion coefficient $\beta_i$ of the i th thermoplastic resin layer and the humidity expansion coefficient $\beta_{i+1}$ of the i+1 th thermoplastic resin layer have a specific relationship, the polarizer and the protective film are not separated from each other even under an environment with high temperature and high humidity.

It has been also found that laminating a film comprising at least one thermoplastic resin layer having a negative photoelastic coefficient and at least one thermoplastic resin layer having a positive photoelastic coefficient in which refractive index $n_i(\lambda)$ at a wavelength $\lambda$ in the range of 380 to 780 nm of the i th thermoplastic resin layer and refractive index $n_{i+1}(\lambda)$ at a wavelength $\lambda$ in the range of 380 to 780 nm of the i+1 th thermoplastic resin layer have a specific relationship onto a polarizer can results in obtaining a polarizing plate with no defective visibility due to light leakage, uneven color, coloring or the like in the vicinity of an edge of a display screen.

It has been also found that in a polarizing plate obtained by laminating a protective film in which refractive index $n_1(380)$ at a wavelength 380 nm and refractive index $n_1(780)$ at a wavelength 780 nm of the thermoplastic resin layer (first thermoplastic resin layer) located closest to the polarizer and refractive index $n_b(380)$ at a wavelength 380 nm and refractive index $n_b(780)$ at a wavelength 780 nm of polyvinyl alcohol contained in the polarizer have a specific relationship onto the polarizer, light interference such as rainbow unevenness and coloring is hard to occur.

The present invention was completed based on the above findings.

That is, the present invention includes the following:

(1) A protective film for polarizing plate comprising k layers (k is an integer of 2 or more) of thermoplastic resin laminated, in which refractive index $n_i(380)$ at the wavelength 380 nm and refractive index $n_i(780)$ at the wavelength 780 nm in the i th thermoplastic resin layer as well as refractive index $n_{i+1}(380)$ at the wavelength 380 nm and refractive index $n_{i+1}(780)$ at the wavelength 780 nm in the i+1 th thermoplastic resin layer have a relationship in a formula [1].

$$\||n_i(380)-n_{i+1}(380)|-|n_i(780)-n_{i+1}(780)|\| \leq 0.02$$

(where, i is an integer from 1 to k−1)  Formula [1]

(2) The protective film for polarizing plate described in (1) in which refractive index $n_i(\lambda)$ at a wavelength λ in the range from 380 to 780 nm in the i th thermoplastic resin layer and refractive index $n_{i+1}(\lambda)$ at the wavelength λ in the range from 380 to 780 nm in the i+1 th thermoplastic resin layer have the relationship in a formula [2] and the absolute value of a photoelastic coefficient is $10 \times 10^{-12}$ $Pa^{-1}$ or less.

$$|n_i(\lambda)-n_{i+1}(\lambda)| \leq 0.05$$

(where, i is an integer of 1 to k−1)  Formula [2]

(3) The protective film for polarizing plate described in any one of (1) to (2), comprising at least one thermoplastic resin layer having a negative photoelastic coefficient and at least one thermoplastic resin layer having a positive photoelastic coefficient.

(4) The protective film for polarizing plate described in (1), comprising at least one thermoplastic resin layer having a negative photoelastic coefficient and at least one thermoplastic resin layer having a positive photoelastic coefficient, in which refractive index $n_i(\lambda)$ at a wavelength λ in the range of 380 to 780 nm in the i th thermoplastic resin layer and refractive index $n_{i+1}(\lambda)$ at a wavelength λ in the range of 380 to 780 nm in the i+1 th thermoplastic resin layer have a relationship in a formula [2].

$$|n_i(\lambda)-n_{1+1}(\lambda)| \leq 0.05$$

(where, i is an integer of 1 to k−1)  Formula [2]

(5) A protective film for polarizing plate comprising k layers (k is an integer of 2 or more) of thermoplastic resin laminated, in which every one of the k layers of thermoplastic resin is made of a material with a haze of 0.5% or less and containing an amorphous thermoplastic resin, and a humidity expansion coefficient $\beta_i$ of the i th thermoplastic resin layer and a humidity expansion coefficient $\beta_{i+1}$ of the i+1 th thermoplastic resin layer have a relationship in a formula [3].

$$|\beta_i-\beta_{i+1}| \leq 40 \text{ ppm/\% RH}$$  Formula [3]

(where, i is an integer of 1 to k−1)

(6) The protective film for polarizing plate described in any one of (1) to (5), in which at least one layer of the k layers of thermoplastic resin is a thermoplastic layer with a water absorption coefficient of 0.5% or less.

(7) The protective film for polarizing plate described in any one of (1) to (6) which is obtained by coextrusion.

(8) The protective film for polarizing plate described in any one of (1) to (7), which further comprises an antireflection layer laminated directly or indirectly on the surface of the k th thermoplastic resin layer.

(9) A polarizing plate comprising a laminate of the protective film for polarizing plate described in any one of (1) to (8) and a polarizer.

(10) The polarizing plate described in (9), in which the polarizer contains polyvinyl alcohol;

the protective film for polarizing plate is laminated on the polarizer faced with the first thermoplastic resin layer therein; and refractive index $n_1(380)$ at a wavelength 380 nm and refractive index $n_1(780)$ at a wavelength 780 nm in the first thermoplastic resin layer as well as refractive index $n_b(380)$ at a wavelength 380 nm and refractive index $n_b(780)$ at a wavelength 780 nm in the polyvinyl alcohol have a relationship in a formula [4].

$$\||n_i(380)-n_b(380)|-|n_i(780)-n_b(780)|\| \leq 0.02 \quad \text{Formula [4]}$$

(11) The polarizing plate described in (9) or (10), in which refractive index $n_1(\lambda)$ at a wavelength λ in the range of 380 to 780 nm in the first thermoplastic resin layer in the protective film for polarizing plate and refractive index $n_b(\lambda)$ at a wavelength λ in the range of 380 to 780 nm in the polyvinyl alcohol contained in the polarizer have a relationship in a formula [5].

$$|n_i(\lambda)-n_b(\lambda)| \leq 0.04 \quad \text{Formula [5]}$$

(12) The polarizing plate described in any one of (9) to (11), in which there is no linear recess portion with a depth of 50 nm or more and a width of 500 nm or less on the surface of the k th thermoplastic resin layer in the protective film for the polarizing plate.

(13) The polarizing plate described in any one of (9) to (12), in which there is no linear projection portion with a height of 50 nm or more and a width of 500 nm or less on the surface of the k th thermoplastic resin layer in the protective film for the polarizing plate.

(14) A liquid crystal display comprising the polarizing plate described in any one of (9) to (13) and a liquid crystal panel.

(15) The liquid crystal display described in (14), in which the polarizing plate is arranged on the observer side of a liquid crystal panel.

EFFECTS OF THE INVENTION

The protective film for polarizing plate of the present invention has interference fringes hard to occur, excellent color reproduction, and fewer occurrences of scratches by friction, so laminating of the protective film on a polarizer can give a polarizing plate which will not cause defective visibility. Moreover, in using of the protective film for polarizing plate of the present invention, a phase difference of the polarizing plate is hardly changed by deformation due to a heat or stress, and obtained can be the polarizing plate which does not have light leakage, uneven color, coloring or the like in the vicinity of an edge of a display screen even if an undesirable and unexpected stress is applied.

Since the polarizing plate of the present invention in which deformation is hard to occur and a fewer scratches occur by friction, visibility is favorable. Also, the polarizer and the protective film are hard to be exfoliated from each other even in a severe environment. Moreover, the polarizing plate of the present invention gives hardly rise to light interference such as rainbow unevenness and coloring, and has fewer occurrences of scratches by friction, so visibility is favorable.

The polarizing plate of the present invention is suitable particularly for a large-area liquid crystal display or the like.

EXPLANATION OF THE SYMBOL

Figure 1:
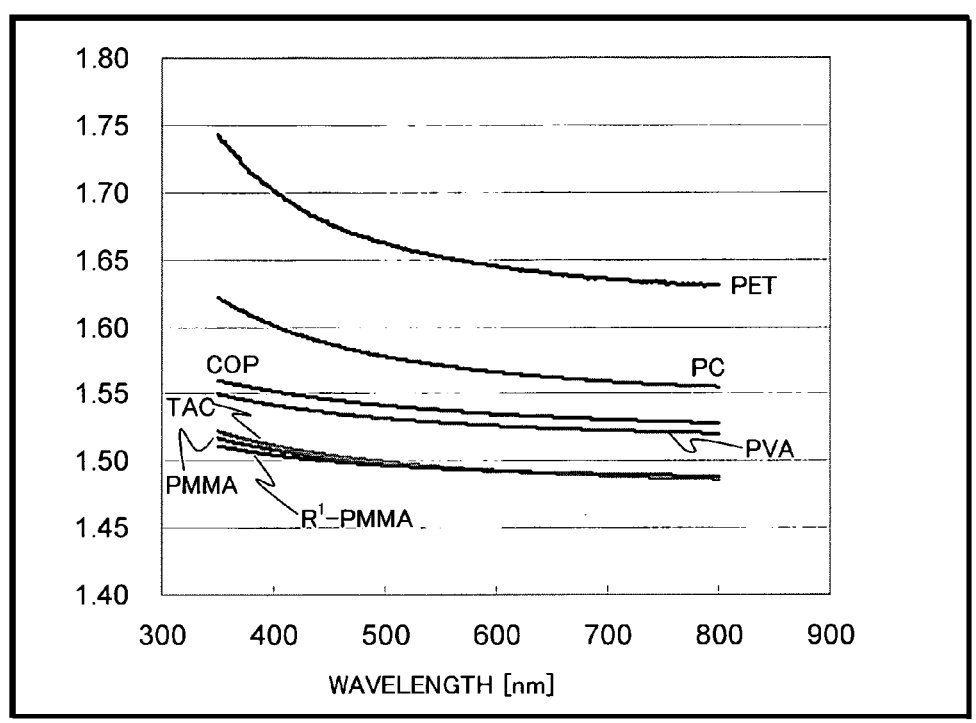
FIG. 1 is a diagram illustrating a refractive index n(λ) of a thermoplastic resin layer used in Examples and Comparative Examples.

PMMA: Polymethylmethacrylate resin;
COP: Alicyclic olefin polymer;
TAC: Tri-acetyl cellulose;
PC: Polycarbonate resin;
PET: Polyethylene terephthalate resin;
$R^1$-PMMA: Polymethylmethacrylate resin mixed with elastic particles

BEST MODE FOR CARRYING OUT THE INVENTION

A protective film for polarizing plate of the present invention comprises k layers (k is an integer of 2 or more) of thermoplastic resin laminated. That is, the first thermoplastic resin layer to the k th thermoplastic resin layer are laminated in this order. The number k is usually 2 to 7, preferably 3 to 5.

The thermoplastic resin constituting the film may be selected from polycarbonate resin, polyethersulphone resin, polyethylene terephthalate resin, polyimide resin, polymethylmethacrylate resin, polysulphone resin, polyarylate resin, polyethylene resin, polyvinyl chloride resin, cellulose diacetate, cellulose triacetate, alicyclic olefin polymer and the like.

Alicyclic olefin polymer is a polymer having alicyclic structure in main chain and/or side chain. As a specific example of alicyclic olefin polymer, random copolymer of cyclic olefin described in Japanese Patent Laid-open No. 05-310845, hydrogenated polymer described in Japanese Patent Laid-open No. 05-97978, and thermoplastic dicyclopentadiene ring-opening polymer and its hydrogenated products described in Japanese Patent Laid-open No. 11-124429 (corresponding to U.S. Pat. No. 6,511,756) can be mentioned. Not all the exemplified thermoplastic resins can be applied to the present invention, but even the same type of the thermoplastic resins include some satisfying the following requirements and others not, and those satisfying the following requirement should be selected.

The thermoplastic resins used in the present invention may be appropriately mixed with compounding agents including coloring agents such as pigment and dye; fluorescent brightening agent, dispersing agent, heat stabilizer, light stabilizer, ultraviolet absorber, antistatic agent, antioxidant, lubricant, solvent and the like. In these compounding agents, a lubricant may be used suitably.

As the lubricant, mentioned can be inorganic particles such as silicon dioxide, titanium dioxide, magnesium oxide, calcium carbonate, magnesium carbonate, barium sulfate and strontium sulfate as well as organic particles such as polymethylacrylate, polymethylmethacrylate, polyacrylonitrile, polystyrene, cellulose acetate, cellulose acetate propionate. The organic particles are preferable as particles constituting the lubricant, and particles made of polymethylmethacrylate are particularly preferable among them.

As the lubricant, elastic particles made of rubber-like elastic body may be used. The rubber-like elastic bodies include acrylic ester rubber-like polymer, rubber-like polymer with butadiene as its main component, ethylene-vinylacetate copolymer and the like. The acrylic ester rubber-like polymers include those with butyl acrylate, 2-ethylhexyl acrylate as its main component. Among them, acrylic ester rubber-like polymer with butyl acrylate as its main component or a rubber-like polymer with butadiene as its main component is preferable. The elastic particles may be two types of polymers in a layered state, which are represented by an elastic particle in which a grafted rubber elastic component layer of alkyl acrylate such as butyl acrylate and styrene and a hard resin layer made of a polymer of methylmethacrylate and/or a copolymer of methylmethacrylate and alkyl acrylate constitute a core-shell structure.

The elastic particle which can be used in the present invention has a number average particle size of usually 2.0 μm or less, preferably 0.1 to 1.0 μm, or more preferably 0.1 to 0.5 μm or less in a state dispersed in the thermoplastic resin. Even if the principal particle size of the elastic particle is small, when the number average particle size of a secondary particle formed by aggregation or the like is large, the protective film for polarizing plate has a high haze and low light transmittance, which is not suitable for a display screen. If the number average particle size is too small, on the contrary, there is a tendency that flexibility is lowered.

In the present invention, refractive index $n_p(\lambda)$ at a wavelength 380 to 780 nm of the elastic particle and refractive index $n_r(\lambda)$ at a wavelength 380 to 780 nm of the thermoplastic resin to be a matrix preferably satisfy a formula [6].

$$|n_p(\lambda)-n_r(\lambda)|\leq 0.05 \qquad \text{Formula [6]}$$

Particularly, $|n_p(\lambda)-n_r(\lambda)|\leq 0.045$ is more preferable. $n_p(\lambda)$ and $n_r(\lambda)$ are average values of principal refractive indexes at the wavelength λ. If the value of $|n_p(\lambda)-n_r(\lambda)|$ exceeds the above value, there is a fear that transparency is lost due to interface reflection caused by refractive index difference on the interface.

The thermoplastic resin used in the present invention has light transmittance in a visible region of 400 to 700 nm in a 1-mm thickness of preferably 80% or more, more preferably 85% or more and further preferably 90% or more. The thermoplastic resin is preferably an amorphous resin from the viewpoint of transparency. Those with a glass transition temperature of 60 to 200° C. are preferable, and 100 to 180° C. is more preferable. The glass transition temperature can be measured by differential scanning calorimetry (DSC).

In the protective film for polarizing plate of the present invention, refractive index $n_i(380)$ at a wavelength 380 nm and refractive index $n_i(780)$ at a wavelength 780 nm in the i th thermoplastic resin layer as well as refractive index $n_{i+1}(380)$ at a wavelength 380 nm and refractive index $n_{i+1}(780)$ at a wavelength 780 nm in the i+1 th thermoplastic resin layer have a relationship in a formula [1].

$$||n_i(380)-n_{i+1}(380)|-|n_i(780)-n_{i+1}(780)||\leq 0.02$$

(where, i is an integer of 1 to k−1) Formula [1]

That is, differences of the refractive indexes in the vicinity of an upper limit and a lower limit in the visible light region between the adjacent thermoplastic resin layers constituting the protective film are not so far from each other. Particularly, $||n_i(380)-n_{i+1}(380)|-|n_i(780)-n_{i+1}(780)||\leq 0.01$ is preferable. $n_i(380)$ and $n_{i+1}(380)$ are average values of principal refractive indexes of the i th thermoplastic resin layer and the i+1 th thermoplastic resin layer at the wavelength of 380 nm. $n_i(780)$ and $n_{i+1}(780)$ are average values of principal refractive indexes of the i th thermoplastic resin layer and the i+1 th thermoplastic resin layer at the wavelength of 780 nm. The i th thermoplastic resin layer and the i+1 th thermoplastic resin layer adjacent to each other may be in direct contact or in contact through an adhesive layer to be described.

In the protective film for polarizing plate of the present invention, refractive index $n_i(\lambda)$ at a wavelength $\lambda$ in the range of 380 to 780 nm in the i th thermoplastic resin layer and refractive index $n_{i+1}(\lambda)$ at a wavelength $\lambda$ in the range of 380 to 780 nm in the i+1 th thermoplastic resin layer preferably have a relationship in a formula [2], and the absolute value of a photoelastic coefficient is $10 \times 10^{-12}$ $Pa^{-1}$ or less.

$$|n_i(\lambda)-n_{i+1}(\lambda)| \leq 0.05$$

(where, i is an integer of 1 to k−1)             Formula [2]

In the protective film for polarizing plate of the present invention, since the relationship in the above Formula [2] is established and the photoelastic coefficient is in the above range, the phase difference of the polarizing plate is difficult to be changed by deformation due to heat or stress, which can result in obtaining a polarizing plate not having light leakage, uneven color, coloring or the like in the vicinity of the edge of the display screen, even if an undesirable and unexpected stress is applied.

In the above Formula [2], $|n_i(\lambda)-n_{i+1}(\lambda)| \leq 0.045$ is more preferable.

The photoelastic coefficient is a value indicating stress dependence of birefringence generated when a stress is applied, and a difference $\Delta n$ of the refractive indexes is determined by a product of a stress $\sigma$ and the photoelastic coefficient C. The photoelastic coefficient can be measured by using a photoelastic coefficient measuring device under a condition of a temperature at 20±2° C. and a humidity of 60±5%. In the present invention, the absolute value of the photoelastic coefficient is preferably $7 \times 10^{-12}$ $Pa^{-1}$ or less or more preferably $5 \times 10^{-12}$ $Pa^{-1}$ or less.

In the protective film for polarizing plate of the present invention, at least one of the laminated thermoplastic resin layers preferably has a negative photoelastic coefficient, and at least another is preferably a thermoplastic resin layer having a positive photoelastic coefficient.

The thermoplastic resin layer having a negative photoelastic coefficient is a resin layer whose $\Delta n$ becomes negative when a positive stress $\sigma$ is applied. The thermoplastic resin layer having a positive photoelastic coefficient is a resin layer whose $\Delta n$ becomes positive when a positive stress $\sigma$ is applied. The thermoplastic resins constituting each thermoplastic resin layer are not particularly limited as long as the layer having the above coefficient can be formed, and the resin may be alone or a combination of two or more. The combination of two or more includes not only the combination of the thermoplastic resins having the photoelastic coefficient in the same sign but also the combination of the thermoplastic resin with the negative photoelastic coefficient and the thermoplastic resin with the positive photoelastic coefficient.

The thermoplastic resin having the negative photoelastic coefficient includes polymethylmethacrylate resin, polystyrene, poly-α-methylstyrene, ethylene-tetracyclododecene addition copolymer and the like.

The thermoplastic resin having the positive photoelastic coefficient includes polycarbonate resin, polysulphone resin, polyalirate resin, polyethersulphone resin, polyethylene-terephthalate resin, ring-opening polymers of norbornene structure-containing monomer such as tetracyclododecene and dicyclopentadiene and their hydrogenated products, and cellulose triacetate and the like.

In the protective film for polarizing plate of the present invention, every one of the k layers of thermoplastic resin is formed of a material with haze of 0.5% or less and include an amorphous thermoplastic resin, and a humidity expansion coefficient $\beta_i$ of the i th thermoplastic resin layer and a humidity expansion coefficient $\beta_{i+1}$ of the i+1 th thermoplastic resin layer preferably satisfy the relationship in the formula [3].

$$|\beta_i-\beta_{i+1}| \leq 40 \text{ ppm/\% RH}$$             Formula [3]

In the protective film for polarizing plate of the present invention, since each thermoplastic resin layer is formed of a material with haze of 0.5% or less and includes an amorphous thermoplastic resin, and the relationship in the above formula [3] is satisfied, deformation is hard to occur and generation of a scratch by friction is less. Thus, a polarizing plate in which visibility does not become poor, and the polarizer and the protective film do not separate from each other even under a severe environment can be obtained.

Each of the k layers of thermoplastic resin is more preferably formed of a material with haze of 0.1% or less. The haze value can be determined as an arithmetic average value by measuring five flat plates with the thickness of 2 mm fabricated by a injection molding method using a molding die without projections or recesses on the surface in compliance with JIS (Japan Industrial Standards) K7105 by a turbid meter on the market such as "Turbid meter NDH-300A" by Nippon Denshoku Industries, Co., Ltd.

The amorphous thermoplastic resin is a thermoplastic resin not having a melting point and can be selected from the above thermoplastic resins. A content of the amorphous thermoplastic resin is preferably 60 to 100 weight % in the thermoplastic resin layer. In the above formula [3], $|\beta_i-\beta_{i+1}| \leq 30$ ppm/% RH is more preferable.

In the protective film for polarizing plate of the present invention, water absorption coefficient of at least one layer in the k layers of thermoplastic resin is preferably 0.5% or less, or particularly preferably 0.1% or less. Using those with a lower water absorption coefficient in the protective film for polarizing plate result in improvement of durability of the polarizing plate. The water absorption coefficient of the thermoplastic resin layer can be determined in compliance with JIS K7209.

Also, in the protective film for polarizing plate of the present invention, moisture permeability is preferably 1 to 200 g/(m²·24 hr), more preferably 5 to 180 g/(m²·24 hr), or particularly preferably 10 to 150 g/(m²·24 hr). If the moisture permeability is too low, drying of an adhesive used at lamination might be insufficient. On the contrary, if the moisture permeability is too high, the polarizer might easily absorb water vapor in the air. Therefore, by keeping the moisture permeability in the above range, durability of the polarizing plate can be improved. The moisture permeability can be measured at the temperature of 40° C. and humidity of 90% using a cup method according to JIS Z0208.

The preferable protective film for polarizing plate of the present invention has at least one thermoplastic resin layer (hereinafter referred to as an "intermediate layer") between the k th thermoplastic resin layer and the first thermoplastic resin layer. The intermediate layer may be constructed by a thermoplastic resin of a type different from the thermoplastic resin forming the k th thermoplastic resin layer and the first thermoplastic resin layer or may be constructed by a thermoplastic resin of the same type.

Also, when the polarizing plate is configured by providing the protective film for polarizing plate on the polarizer, in order to prevent warping, curving or rounding of the polarizing plate, the thermoplastic resin forming the k th thermoplastic resin layer and the thermoplastic resin forming the first thermoplastic resin layer are preferably selected from the same type of thermoplastic resin.

The thermoplastic resin forming the k th thermoplastic resin layer is preferably hard. Specifically, pencil hardness (in compliance with JIS K 5600-5-4 except that a test load is 500 g) is preferably harder than 2H. The most preferable thermoplastic resin forming the k th thermoplastic resin layer is selected from the acrylic resins such as polymethylmethacrylate resin.

The laminated thermoplastic resin layer may be in direct contact with each other or in contact through an adhesive layer. The adhesive layer is a layer made of a material with a tensile breaking strength according to JIS K7113 of 40 MPa or less. The adhesive layer preferably has an average thickness of usually 0.01 to 30 μm, and preferably 0.1 to 15 μm. The adhesive constituting the adhesive layer includes acrylic adhesive, urethane adhesive, polyester adhesive, polyvinyl alcohol adhesive, polyolefin adhesive, modified polyolefin adhesive, polyvinylalkylether adhesive, rubber adhesive, vinyl chloride-vinyl acetate adhesive, SEBS adhesive, ethylene adhesive such as ethylene-styrene copolymer, acrylate adhesive such as ethylene-methyl acrylate copolymer and ethylene-ethyl acrylate copolymer, methacrylate adhesive such as ethylene-methyl methacrylate copolymer, ethylene-ethyl methacrylate copolymer and the like.

The thermoplastic resin layer forming the protective film for polarizing plate of the present invention is not particularly limited by the respective thicknesses, but the average thickness of the k th thermoplastic resin layer is usually 5 to 100 μm, or preferably 10 to 50 μm. The average thickness of the first thermoplastic resin layer is usually 5 to 100 μm, or preferably 10 to 50 μm. Also, the average thickness of the intermediate layer provided as necessary is usually 5 to 100 μm, or preferably 10 to 50 μm. The average thickness of the protective film for polarizing plate is usually 20 to 200 μm, or preferably 40 to 100 μm.

Moreover, the average thickness of the k th thermoplastic resin layer and the average thickness of the first thermoplastic resin layer are preferably substantially equal. Specifically, the absolute value in a difference between the average thickness of the k th thermoplastic resin layer and the average thickness of the first thermoplastic resin layer is preferably 20 μm or less, or more preferably 10 μm or less. The ratio between the average thickness of the intermediate layer and the average thickness of the k th thermoplastic resin layer or the average thickness of the first thermoplastic resin layer is not particularly limited but is preferably 5:1 to 1:5.

In the protective film for polarizing plate of the present invention, its in-plane retardation Re (a value defined by $Re = d \times (n_x - n_y)$. The $n_x$ and $n_y$ are in-plane principal refractive index of the protective film for polarizing plate ($n_x$ is a refractive index of an in-plane delay phase axis and $n_y$ is a refractive index in a direction perpendicular to the delay phase axis in the plane; d is an average thickness of the protective film for polarizing plate) is preferably smaller and specifically the in-plane retardation Re at the wavelength of 550 nm is preferably 50 nm or less, or more preferably 10 nm or less.

In the protective film for polarizing plate of the present invention, the absolute value of its retardation Rth in the film-thickness direction (a value defined by $Rth = d \times ((n_x + n_y)/2 - n_z)$; $n_x$ is a refractive index of an in-plane delay phase axis, $n_y$ is a refractive index in a direction perpendicular to the delay phase axis in the plane, $n_z$ is a refractive index in the film thickness direction, and d is an average thickness of the protective film for polarizing plate) is preferably smaller. Specifically, the retardation Rth in the film thickness direction of the protective film for polarizing plate is preferably −10 to +10 nm, or more preferably −5 nm to +5 nm at the wavelength of 550 nm.

The protective film for polarizing plate of the present invention is not particularly limited by its manufacture but includes the one obtained by bonding single layered films of the thermoplastic resin together, the one obtained by coextrusion molding of two or more thermoplastic resins, the one obtained by casting thermoplastic resin solution onto a thermoplastic resin film or the like. The one obtained by coextrusion molding is preferable from the viewpoint of productivity.

In the protective film for polarizing plate of the present invention, an antireflection layer is preferably provided on the surface of the k th thermoplastic resin layer directly or indirectly. The average thickness of the antireflection layer is preferably 0.01 to 1 μm, or more preferably 0.02 to 0.5 μm. The antireflection layer can be selected from those known. For example, the one in which a low refractive-index layer with a refractive index smaller than that of the k th thermoplastic resin layer, preferably the refractive index 1.30 to 1.45, is laminated, the one in which a low refractive-index layer made of an inorganic compound and a high refractive-index layer made of an inorganic compound are alternately laminated, the one in which a low refractive-index layer formed by a material having a micro air hollow is laminated on a high refractive-index layer having a high surface hardness or the like can be mentioned. In the present invention, preferable is the one in which a low refractive-index layer formed by a material having a micro air hollow is laminated on a high refractive-index layer having a high surface hardness.

Then, the antireflection layer in which a low refractive-index layer formed by a material having a micro air hollow is laminated on a high refractive-index layer having a high surface hardness will be described. The antireflection layer in which a low refractive-index layer formed by a material having a micro air hollow is laminated on a high refractive-index layer having a high surface hardness is laminated with the low refractive-index layer faced with the visible side.

The low refractive-index layer preferably used in the present invention is made of a material having a micro air hollow. The thickness of the low refractive-index layer is usually 10 to 1000 nm, or preferably 30 to 500 nm.

A material having the micro air hollow includes aero gel. The aero gel is a transparent porous body in which micro air cavities are dispersed in a matrix. The size of the air cavity is mainly 200 nm or less, and a content of the air cavity is usually 10 to 60 volume %, or preferably 20 to 40 volume %. The aero gel is classified into a silica aero gel and a porous body in which a hollow particle is dispersed in a matrix.

The silica aero gel can be manufactured, as disclosed in U.S. Pat. No. 4,402,927, U.S. Pat. No. 4,432,956 and U.S. Pat. No. 4,610,863, by moistening a gel compound made of silica framework obtained by hydrolytic polymerization of alkoxysilane in a disperse medium such as alcohol or carbon dioxide and by supercritical drying the moistened to remove the medium. Also, silica aero gel can be manufactured similarly as the above with sodium silicate as a material as disclosed in U.S. Pat. No. 5,137,279 and U.S. Pat. No. 5,124,364.

In the present invention, as disclosed in Japanese Patent Laid-Open No. 5-279011 and Japanese Patent Laid-Open No. 7-138375 (U.S. Pat. No. 5,496,527), it is preferable to give a hydrophobic character to silica aero gel by hydrophobizing processing of a gel-state compound obtained by hydrolysis and polymerization of alkoxysilane. With this hydrophobic silica aero gel to which a hydrophobic character is given, moisture or water is hard to intrude and performances of silica aero gel such as refractive index and light transmittance can be prevented from being lowered.

A porous body in which a hollow particulate is dispersed in a matrix includes porous bodies as disclosed in Japanese patent Laid-Open No. 2001-233611 and Japanese Patent Laid-Open No. 2003-149642. The porous body in which the hollow particulate is dispersed in the matrix shall not be included in the thermoplastic resin layer.

The material used in the matrix is selected from materials satisfying conditions such as dispersibility of the hollow particulate, transparency of the porous body, strength of the porous body and the like. For example, polyester resin, acrylic resin, urethane resin, vinyl chloride resin, epoxy resin, melamine resin, fluorine resin, silicone resin, butyral resin, phenol resin, vinyl acetate resin, hydrolyzable organic silicon compounds such as alkoxysilane and their hydrolysates, and the like can be mentioned.

Among them, from the viewpoint of dispersibility of the hollow particulate and strength of the porous body, acrylic resin, epoxy resin, urethane resin, silicone resin, hydrolyzable organic silicon compounds and their hydrolyzed products are preferable.

The hollow particulate is not particularly limited but inorganic hollow particulates are preferable, and silica hollow particulates are particularly preferable. Inorganic compounds constituting the inorganic hollow particulate include $SiO_2$, $Al_2O_3$, $B_2O_3$, $TiO_2$, $ZrO_2$, $SnO_2$, $Ce_2O_3$, $P_2O_5$, $Sb_2O_3$, $MoO_3$, $ZnO_2$, $WO_3$, $TiO_2$—$Al_2O_3$, $TiO_2$—$ZrO_2$, $In_2O_3$—$SnO_2$, $Sb_2O_3$—$SnO_2$ and the like.

The outer shell of the hollow particulate may be porous having a fine pore or may be such that the fine pore is blocked and a cavity is sealed against the outside of the outer shell. The outer shell is preferably in a multi-layered structure made of an inner layer and an outer layer. When a fluorine-containing organic silicon compound is used for forming the outer layer, the refractive index of the hollow particulate is lowered, dispersibility to the matrix is improved, and moreover, an advantage to apply antifouling property to the low refractive-index layer is obtained. Specific examples of fluorine-containing organic silicon compound include 3,3,3-trifluoropropyltrimethoxysilane, methyl-3,3,3-trifluoro-propyldimethoxysilane, heptadeca-fluoro-decylmethyldimethoxysilane, heptadeca-fluoro-decyltrichlorosilane, heptadeca-fluoro-decyltrimethoxysilane, trideca-fluoro-octyltrimethoxysilane, and the like.

The thickness of the outer shell is usually 1 to 50 nm, or preferably 5 to 20 nm. Also, the thickness of the outer shell is preferably within a range of 1/50 to 1/5 of an average particle size of the inorganic hollow particulate.

In the cavity, a medium used when preparing the hollow particulate and/or a gas which intrudes during drying may be present or a precursor substance for forming the cavity may remain in the cavity.

The average particle size of the hollow particulate is not particularly limited but a range of 5 to 2,000 nm is preferable, and 20 to 100 nm is more preferable. The average particle size is number average particle size by microscope observation by transmission-electron microscope.

In the present invention, the protective film for polarizing plate in which the antireflection layer is laminated preferably has a reflectivity of 2.0% or less at an incident angle of 50 and a wavelength of 430 to 700 nm, and a reflectivity of 1.0% or less at an incident angle of 5° and a wavelength of 550 nm.

In the present invention, the high refractive-index layer having a high surface hardness can be also used as the k th thermoplastic resin layer, or as a layer different from the k th thermoplastic resin layer (this layer provided separately is referred to as a "hard-coat layer" in some cases) may be provided on the surface of the k th thermoplastic resin layer. The thickness of the high refractive-index layer is preferably 0.5 to 30 μm, or more preferably 3 to 15 μm. The refractive index of the high refractive-index layer is preferably 1.6 or more.

The high refractive-index layer (or hard-coat layer) is formed of a material showing a hardness of "2H" or harder by a pencil hardness test (a test plate is a glass plate) measured in compliance with JIS K5600-5-4 except that a test load is set at 500 g. The materials for hard-coat layer include organic hard-coat materials such as organic silicone hard-coat materials, melamine hard-coat materials, epoxy hard-coat materials, acrylic hard-coat materials, and urethane acrylate hard-coat materials; and inorganic hard-coat materials such as silicon dioxide. Among them, from the viewpoint of favorable adhesion and excellent productivity, use of urethane acrylate and multifunctional acrylate hard-coat materials are preferable.

In the high refractive-index layer, its refractive index $n_H$ preferably has relationships of $n_H \geq 1.53$ and $n_H^{1/2}-0.2 < n_L < n_H^{1/2}+0.2$ with the refractive index $n_L$ of the low refractive-index layer to be laminated thereon.

The high refractive-index layer may contain various fillers with the purpose of adjustment of refractive index, improvement of bending elastic modulus, stabilization of volume shrinkage factor, enhancement of heat resistance, antistatic property, antiglare property and the like. Moreover, various additives may be compounded such as antioxidant, ultraviolet absorber, light stabilizer, antistatic agent, leveling agent, antifoaming agent and the like.

Fillers for adjusting refractive index and antistatic property of the high refractive-index layer include titanium oxide, zirconium oxide, zinc oxide, tin oxide, cerium oxide, antimony pentoxide, indium oxide doped with tin (ITO), tin oxide doped with antimony (IZO), zinc oxide doped with aluminum (AZO), and tin oxide doped with fluorine (FTO). From the viewpoint that transparency can be maintained, antimony pentoxide, ITO, IZO, ATO, and FTO are cited as suitable fillers. The primary particle diameter of these fillers is usually 1 nm or more and 100 nm or less, or preferably 1 nm or more and 30 nm or less.

As a filler to apply antiglare property, those with the average particle size of 0.5 to 10 μm is preferable, 1 to 7 μm is more preferable, and 1 to 4 μm is further preferable. Specific examples of the filler to apply antiglare property includes fillers made from organic resins such as polymethylmethacrylate resin, vinylidene fluoride resin and other fluorine resins, silicone resin, epoxy resin, nylon resin, polystyrene resin, phenol resin, polyurethane resin, cross-linked acrylic resin, cross-linked polystyrene resin, melamine resin, benzoguanamin resin and the like; or fillers made from inorganic compounds such as titanium oxide, aluminum oxide, indium oxide, zinc oxide, antimony oxide, tin oxide, zirconium oxide, ITO, magnesium fluoride, silicon oxide and the like.

In the protective film for polarizing plate of the present invention, anti-glaring means may be provided on the surface.

The protective film for polarizing plate of the present invention after formation of the anti-glaring means preferably has a haze of 5 to 60%, or more preferably 10 to 50%.

The haze can be measured in compliance with JIS K7105 by a turbid meter sold on the market such as NDH-300A haze meter by Nippon Denshoku Industries, Co., Ltd., for example.

A transmission image clarity of the protective film for polarizing plate in the present invention after formation of the anti-glaring means is usually 50 to 100%, or preferably 60 to 100% when an optical comb with a width of 0.5 mm is used. If the transmission image clarity is within the above range, blurring of transmitted light is less and blurring of pixel profile can be prevented even in a high-definition display, and character blurring can be prevented as a result.

The transmission image clarity is a scale to quantify blurring and distortion of light transmitted through a film. A value of transmission image clarity is, after measuring the transmitted light from the film through a moving optical comb, calculated by a light intensity of light and dark parts of the optical comb. That is, when the film blurs the transmitted light, an image of a slit formed on the optical comb becomes thick, and the light intensity at the transmission portion becomes 100% or less, while since light leaks at the non-transmission portion, the light intensity becomes 0% or more. The transmission image clarity C is defined by the following formula from a maximum intensity M of the transmitted light at a transparent portion in the optical comb and a minimum intensity m of the transmitted light at a non-transparent portion in the optical comb.

$$C(\%)=[(M-m)/(M+m)]\times 100$$

The closer the value of C gets to 100%, the smaller blurring of the image is.

As a device for measuring the transmission image clarity, an image clarity measuring device on the market such as an image clarity measuring device ICM-1 produced by Suga Test Instruments Co., Ltd. can be used, for example. An optical comb with width of 0.125 to 2 mm can be used.

In the present invention, both the transmission image clarity and haze after formation of the anti-glaring means are particularly preferably within the above ranges.

The forming method of the anti-glaring means is not particularly limited but appropriate antiglaring means can be employed. For example, they include a method of giving fine irregularity to the protective film for polarizing plate and a method of giving an antiglare function by internal scattering by forming a film layer including a region where the refractive index is discontinuous.

The method of giving fine irregularity is not particularly limited but appropriate methods can be employed. For example, they include a method of giving fine irregularity by roughing processing such as sand blast, emboss roll, chemical etching or the like on the protective film for polarizing plate directly or while another layer is laminated, a method of transferring irregularity by a shape-formed film, a method of dispersing inorganic and/or organic particulates in a resin constituting the protective film for polarizing plate, a method of forming an antiglare layer made of a transparent resin material containing inorganic and/or organic particulates on the protective film for polarizing plate and the like, and two or more of the methods may be combined for use.

Two or more of the above particulates may be used. For example, particulates that exert dispersion effect by a difference in refractive index from the transparent resin material and particulates that exert dispersion effect by forming irregularity on the surface of the resin layer may be both used together.

The above particulate may be present in the resin constituting the protective film for polarizing plate or in the transparent resin material in an evenly dispersed state or biased state with respect to the film thickness direction. Also, the particulate may be present projecting from the surface, but from the viewpoint of improvement in transmission image clarity, projection of the particulate from the surface of the antiglare layer is preferably 0.5 μm or less.

As a method of giving the antiglare function by internal scattering by forming a film layer including a region where the refractive index is discontinuous, there can be a method of forming a film layer having a phase-separation structure by ultraviolet irradiation or the like using two or more compositions with different refractive indexes and a method of forming a film layer containing a transparent resin material and a particulate having a refractive index different from that of the transparent resin material.

The protective film for polarizing plate of the present invention further has an antifouling layer preferably. The antifouling layer is a layer that can impart water repellency, oil repellency, perspiration resistance, antifouling property or the like to the surface of the protective film for polarizing plate. As a material used for forming the antifouling layer, a fluorine-containing organic compound is suitable. The fluorine-containing organic compounds include fluorocarbon, perfluorosilane or their polymer compounds. The average thickness of the antifouling layer is preferably 1 to 50 nm, or more preferably 3 to 35 nm.

Also, in the protective film for polarizing plate of the present invention, other layers including a gas barrier layer, a transparent antistatic layer, a primary layer, an electromagnetic shielding layer, an undercoat layer and the like may be provided.

The polarizing plate of the present invention may be formed by laminating the protective film for polarizing plate of the present invention and a polarizer. When the protective film for polarizing plate of the present invention is laminated on one side of the polarizer, laminated on the another side of the polarizer can be the another protective film for polarizing plate of the present invention or a conventional protective film. The conventional protective film is not particularly limited by its moisture permeability, but it is preferably 0.3 to 40 g/(m²·24 hr), more preferably 0.6 to 20 g/(m²·24 hr), or particularly preferably 1.0 to 10 g/(m²·24 hr). The moisture permeability can be measured at the temperature of 40° C. and humidity of 90% using a cup method according to JIS Z0208.

The polarizer used in the present invention is a known polarizer used in a liquid crystal display or the like. For example, a polarizer obtained by having iodine or diachronic dye adsorbed to a polyvinyl alcohol film and then uniaxially drawn in a boric-acid solution, or the one obtained by having iodine or diachronic dye adsorbed to a polyvinyl alcohol film and drawn and moreover a part of a polyvinyl alcohol unit in a molecular chain is modified to a polyvinylene unit can be cited. In addition, there is a polarizer having a function to isolate polarized light to a reflected light and transmitted light, such as grid polarizer, multi-layer polarizer, and cholesteric liquid-crystal polarizer. Among them, a polarizer containing polyvinyl alcohol is preferable.

When natural light is made to enter the polarizer used in the present invention, only one polarized light is transmitted. The polarization degree of the polarizer used in the present invention is not particularly limited, but it is preferably 98% or more, or more preferably 99% or more. The average thickness of the polarizer is preferably 5 to 80 μm.

The preferable polarizing plate of the present invention has the protective film for polarizing plate laminated with the first thermoplastic resin layer faced with the polarizer side, and refractive index $n_1(380)$ at a wavelength 380 nm and refractive index $n_1(780)$ at a wavelength 780 nm of the first thermoplastic resin layer as well as refractive index $n_b(380)$ at a wavelength 380 nm and refractive index $n_b(780)$ at a wavelength 780 nm of the polyvinyl alcohol b to be contained in the polarizer satisfy a relationship in a formula [4].

$$\||n_1(380)-n_b(380)|-|n_1(780)-n_b(780)|\| \leq 0.02 \qquad \text{Formula [4]}$$

That is, a difference between the refractive index of the first thermoplastic resin layer and the refractive index of polyvinyl alcohol contained in the polarizer at a wavelength close to the upper limit of a visible light region is not so much different from the difference at a wavelength close to the lower limit of a visible light region. Particularly, $\||n_1(380)-n_b(380)|-|n_1(780)-n_b(780)|\| \leq 0.01$ is preferable. Average values of principal refractive indexes at the respective wavelengths are $n_1(380)$ and $n_1(780)$. Refractive indexes of non-oriented polyvinyl alcohol are $n_b(380)$ and $n_b(780)$.

The thermoplastic resin forming the first thermoplastic resin layer is preferably selected from acrylic resin, alicyclic olefin polymer, and polycarbonate resin. Particularly, selection from an acrylic resin such as polymethylmethacrylate resin is preferable.

The preferable polarizing film of the present invention has its polarizer comprising polyvinyl alcohol, the refractive index $n_1(\lambda)$ at a wavelength $\lambda$ in the range of 380 to 780 nm of the first thermoplastic resin layer in the protective film for polarizing plate and the refractive index $n_b(\lambda)$ at a wavelength $\lambda$ in the range of 380 to 780 nm of polyvinyl alcohol contained in the polarizer satisfy a formula [5].

$$|n_1(\lambda)-n_b(\lambda)| \leq 0.04 \qquad \text{Formula [5]}$$

An average value of the principal refractive index at the wavelength $\lambda$ is $n_1(\lambda)$. A refractive index of non-oriented polyvinyl alcohol is $n_b(\lambda)$.

Moreover, in the suitable polarizing plate of the present invention, its protective film for polarizing plate does not have a linear recess portion with the depth of 50 nm or more and the width of 500 nm or less and preferably does not have a linear recess portion with the depth of 30 nm or more and the width of 700 nm or less on the surface of the k th thermoplastic resin layer. The protective film constituting the suitable polarizing plate of the present invention does not have a linear projection portion with the height of 50 nm or more and the width of 500 nm or less and preferably does not have a linear projection portion with the height of 30 nm or more and the width of 700 nm or less on the surface of the k th thermoplastic resin layer. Moreover, it is preferable that the linear projection portion with the height of 50 nm or more and the width of 500 nm or less as above or the linear recess portion with the depth of 50 nm or more and the width of 500 nm or less as above is not provided on the surface of the first thermoplastic resin layer. Not providing such a linear projection portion or linear recess portion can allow preventing light leakage or light interference.

The fact that the linear recess portion with the depth of 50 nm or more and the width of 500 nm or less is not provided on the surface means that the surface is flat or even if there is a linear recess portion, its depth is less than 50 nm or the width exceeds 500 nm. Also, the fact that the linear projection portion with the height of 50 nm or more and the width of 500 nm or less is not provided on the surface means that the surface is flat or even if there is a linear projection portion, its height is less than 50 nm or the width exceeds 500 nm.

The depth of the linear recess portion, the height of the linear projection portion of the film and their widths are determined by a method described below.

Light is irradiated to the film, the transmitted light is projected onto a screen, and a portion with a light-dark stripe of the light appearing on the screen (this portion is where the depth of the linear recess portion and the height of the linear projection portion are large) is cut out by a 30 mm square. The surface of the cut-out film piece is observed using a three-dimensional surface-structural analysis microscope (view region of 5 mm×7 mm), this is converted into a three-dimensional image, and a sectional profile in the MD direction is acquired from the three-dimensional image. The sectional profiles are acquired in the view region with an interval of 1 mm. An average line is drawn on the sectional profile, and the length from the average line to the bottom of the linear recess portion is the linear recess portion depth, or the length from the average line to the top of the linear projection portion is the linear projection portion height. A distance between intersections with the average line and the profile is the width. Maximum values are acquired from measured values of the linear recess portion depth and linear projection portion height, respectively, and the width of the linear recess portion or linear projection portion indicating the maximum value is acquired, respectively. The maximum values of the linear recess portion depth and the liner projection portion height acquired as above and the linear recess portion width and the linear projection portion width indicating the maximum value are set as the depth of the linear recess portion, the height of the linear projection portion, and their widths of the film.

The thermoplastic resin layer not having the linear projection portion and the linear recess portion of the above size can be obtained by carrying out the following means. For example, in the T-die extrusion molding, the layer can be obtained by executing the means such as reduction of the surface roughness of a lip portion on the die, plating the lip tip end portion with chromium, nickel, titanium or the like, thermal spraying of ceramics to the lip tip end portion, forming a coat such as TiN, TiAlN, TiC, CrN, DLC (diamond like carbon) by PVD (Physical Vapor Deposition) on the inner surface of the lip, adjustment to even temperature distribution and air flow around a molten resin immediately after extruded from the die, selection of a resin forming the thermoplastic resin layer with the same level of melt flow rate value and the like. In the cast molding, the layer can be obtained by carrying out means such as use of a cast support film with small surface roughness, reduction of the surface roughness of an applicator, or moreover adjustment of temperature distribution, drying temperature, drying time when drying an applied layer.

In the present invention, the polarizer and the protective film for polarizing plate may be in direct contact or in contact through an adhesive layer. An adhesive constituting the adhesive layer includes acrylic adhesive, urethane adhesive, polyester adhesive, polyvinyl alcohol adhesive, polyolefin adhesive, modified polyolefin adhesive, polyvinylalkylether adhesive, rubber adhesive, vinyl chloride-vinyl acetate adhesive and the like.

A liquid crystal display of the present invention comprises at least one of the polarizing plate of the present invention and a liquid crystal panel. The liquid crystal panel is not particularly limited as long as it is used in a liquid crystal display. For example, TN (Twisted Nematic) liquid crystal panel, STN (Super Twisted Nematic) liquid crystal panel, HAN (Hybrid Alignment Nematic) liquid crystal panel, IPS (In Plane Switching) liquid crystal panel, VA (Vertical Alignment) liquid crystal panel, MVA (Multiple Vertical Alignment) liquid crystal panel, OCB (Optical Compensated Bend) liquid crystal panel and the like can be mentioned.

The preferable liquid crystal display of the present invention has the polarizing plate provided on the visible side of the liquid crystal panel. In the liquid crystal display, usually two polarizing plates are provided so as to hold the liquid crystal panel between them. The visible side of the liquid crystal panel is the side that an observer can visually recognize the display screen. The polarizing plate of the present invention, particularly the polarizing plate with the protective film for polarizing plate laminated on the visible side, has excellent visibility and it is preferably arranged on the visible side of the liquid crystal panel.

EXAMPLES

Examples and Comparative examples will be shown below in order to describe the present invention more specifically, but the present invention is not limited to the following embodiments but includes a case of four or more thermoplastic resin layers or a case of two layers, for example. Also, part and % are weight standard unless specifically noted.
(Preparation of Composition for Forming High Refractive-Index Layer (Hard-Coat Layer))

By a homogenizer, 30 parts of 6 functional urethane acrylate oligomer, 40 parts of butyl acrylate, 30 parts of isobornyl methacrylate, and 10 parts of 2,2-diphenylethane-1-one were mixed, and 40%-methyl isobutyl ketone dispersion of antimony pentoxide particulate (average particle size of 20 nm, one hydroxyl group was bound to an antimony atom appearing on the surface of the pyrochlore structure) was mixed in a proportion that the weight of the antimony pentoxide particulate occupies 50 weight % of the whole solid content in the composition for forming the high refractive-index layer so as to prepare a composition H for forming high refractive-index layer.
(Preparation of Composition for Forming Low Refractive-Index Layer)

So as to obtain silicon resin with the weight average molecular weight of 850, 21 parts of tetramethoxysilane oligomer, 36 parts of methanol, 2 parts of water, and 2 parts of 0.01N hydrochloric aqueous solution were mixed and agitated in a high-temperature bath at 25° C. for 2 hours. Next, sol of the hollow silica particulate dispersed in isopropanol (solid content of 20%, average principal particle size of approximately 35 nm, outer shall thickness of approximately 8 nm) was added to the silicon resin so that the hollow silica particulate/silicon resin (condensation compound equivalent) to the solid content base was 8:2 in a weight ratio. Finally, the composition L for forming low refractive-index layer was prepared through dilution by methanol so that the entire solid content becomes 1%.
(Fabrication of Polarizer)

Polyvinyl alcohol (PVA) film with the thickness of 75 μm and the refractive index at the wavelength 380 nm of 1.545 as well as the refractive index at the wavelength 780 nm of 1.521 was uniaxially drawn to 2.5 times, immersed in a solution at 30° C. containing 0.2 g/L of iodine and 60 g/L of potassium iodide for 240 seconds, and then, immersed in a solution containing 70 g/L of boric acid and 30 g/L of potassium iodide and unixially drawn to 6.0 times at a time, and held for 5 minutes. Finally, it was dried at a room temperature for 24 hours to obtain a polarizer P with the average thickness of 30 μm and polarization degree of 99.95%.

Example 1

Fabrication of Protective Film for Polarizing Plate

Polymethylmethacrylate resin (water absorption coefficient of 0.3%, photoelastic coefficient of $-6.0 \times 10^{-12}$ $Pa^{-1}$, haze of 0.08%, humidity expansion coefficient of 28 ppm/% RH, tensile elastic modulus of 3.3 GPa. Abbreviated as "PMMA") was inputted to a double-flight type uniaxial extruder with a leaf-disk shaped polymer filter with an opening of 10 μm installed, and a molten resin was supplied to one of multi-manifold die with a die lip having surface roughness Ra of 0.1 μm at an extruder outlet temperature of 260° C.

On the other hand, an alicyclic olefin polymer (hydrogenated product of ring-opening polymer of a norbornene monomer, water absorption coefficient of less than 0.01%, photoelastic coefficient of $6.3 \times 10^{-12}$ $Pa^{-1}$, haze of 0.02%, humidity expansion coefficient of less than 1 ppm/% RH, tensile elastic modulus of 2.4 GPa. Abbreviated as "COP") was inputted to a double-flight type uniaxial extruder with a leaf-disk shaped polymer filter with an opening of 10 μm installed, and a molten resin was supplied to the another of multi-manifold die with a die lip having surface roughness Ra of 0.1 μm at an extruder outlet temperature of 260° C.

And the polymethylmethacrylate resin in the molten state, alicyclic olefin polymer in the molten state, and ethylene-vinyl acetate copolymer as an adhesive in the molten state were respectively discharged from the multi-manifold die at 260° C. and cast to a cooling roll whose temperature was adjusted to 130° C., and then, passed between the cooling rolls at a temperature adjusted to 50° C. so as to obtain a protective film 1A for polarizing plate with the width of 600 mm and the thickness of 80 μm in a three-layers structure of the polymethylmethacrylate resin layer (20 μm)—adhesive layer (4 μm)—alicyclic olefin polymer layer (32 μm)—adhesive layer (4 μm)—polymethylmethacrylate resin layer (20 μm) by coextrusion molding. The protective film 1A for polarizing plate had moisture permeability of 3.5 g/(m²·24 h), photoelastic coefficient of $1 \times 10^{-12}$ $Pa^{-1}$, and a difference in humidity expansion coefficient between adjacent layers at 27 ppm/% RH, and its surface was a flat face without linear recess portion or linear projection portion. The polymethylmethacrylate resin layer had distribution of the refractive index n(λ) as shown in FIG. 1, and alicyclic olefin polymer layer had distribution of the refractive index n(λ) as shown in FIG. 1. The polymethylmethacrylate resin layers on both sides had the refractive index at the wavelength 380 nm of 1.512 and the refractive index at the wavelength of 780 nm of 1.488, while the alicyclic olefin polymer layer had the refractive index at the wavelength 380 nm of 1.555 and the refractive index at the wavelength of 780 nm of 1.529. The value of the formula [1] was 0.002.
(Fabrication of Polarizing Plate)

On one face of a lengthy undrawn film with the thickness of 100 μm made of alicyclic olefin polymer (glass transition temperature of 136° C.), corona discharge processing was applied using a high-frequency transmitter so as to have a film 1B with surface tension of 0.055 N/m.

An acrylic adhesive was applied to both faces of the polarizer P, and one face of the protective film 1A for polarizing plate and the corona-discharge processed face of the film 1B were faced with the polarizer P, and stacked and bonded by a roll-to-roll method so as to obtain a polarizing plate 1. Evaluation results are shown in Table 1 and Table 2.

Figure 2:
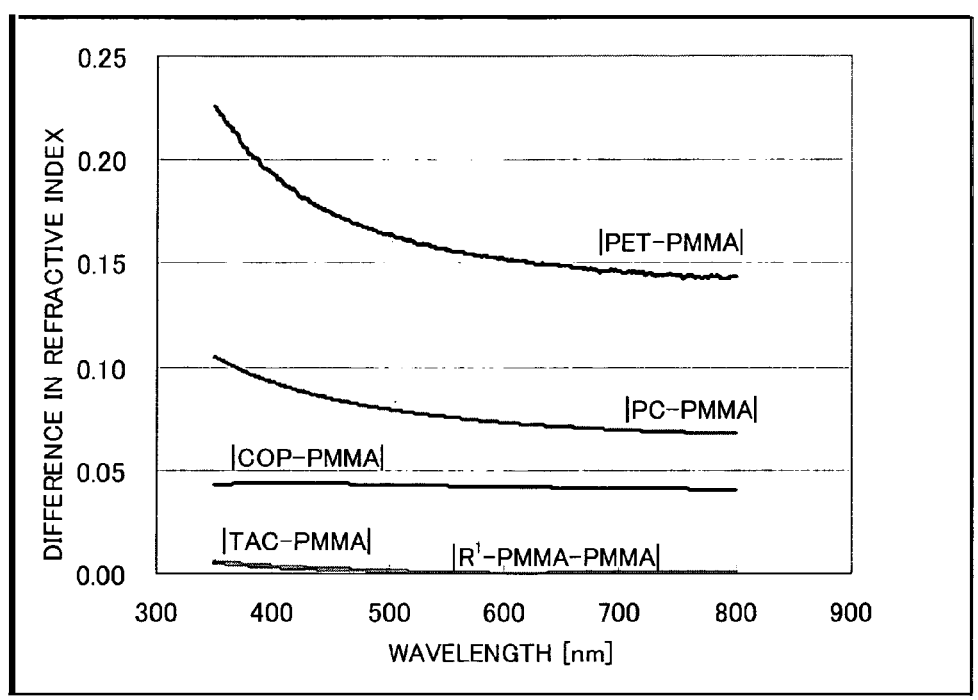
FIG. 2 is a diagram illustrating distribution of the absolute values of differences between refractive index n(λ) of a polymethylmethacrylate resin layer and refractive index n(λ) of another thermoplastic resin layer used in Examples and Comparative Examples.
Figure 3:
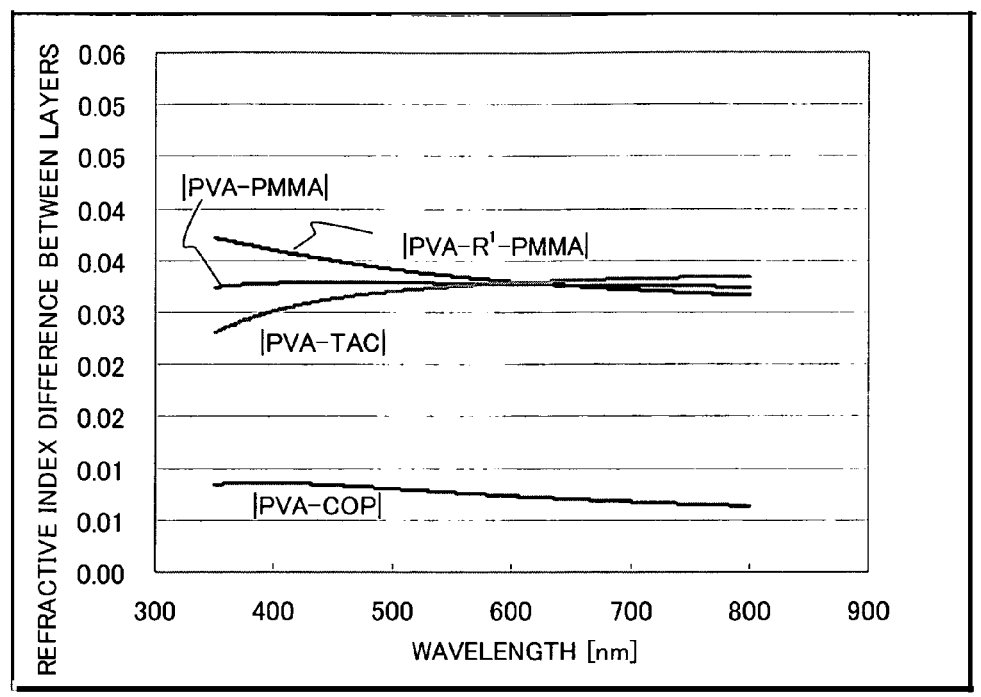
FIG. 3 is a diagram illustrating distribution of the absolute values of differences between refractive index n(λ) of polyvinyl alcohol and refractive index n(λ) of a thermoplastic resin layer used in Examples and Comparative Examples.

FIG. 2 shows distribution of absolute values of a difference between the refractive index n(λ) of the polymethylmethacrylate resin layer and the refractive index n(λ) of the alicyclic olefin polymer layer. The polymethylmethacrylate resin layer and the alicyclic olefin polymer layer satisfied the relationship in the formula [2]. FIG. 3 shows distribution of absolute values of a difference between the refractive index n(λ) of the polyvinyl alcohol contained in the polarizer and the refractive index n(λ) of the polymethylmethacrylate resin layer. The polyvinyl alcohol contained in the polarizer and the polymethylmethacrylate resin layer had the value of the formula [4] at 0 and satisfied the relationship in the formula [5]. The obtained polarizing plate was attached to a liquid crystal display so that the film 1A was on the side far from the liquid crystal panel.

Example 2

On one face of a cellulose triacetate film with the thickness of 80 μm, 25 mL/m² of 1.5 mol/L isopropylalcohol solution of potassium hydroxide was applied and dried at 25° C. for 5 seconds. Then, it was washed by running water for 10 seconds and the surface of the film was dried by blowing air of 25° C. at the end to obtain a film 2B in which only one face of the triacetyl cellulose film was saponified.

An acrylic adhesive was applied on one face of the protective film 1A for polarizing plate, while a polyvinyl alcohol adhesive was applied on the saponified face of the film 2B, and the protective film 1A for polarizing plate, the polarizer P and the film 2B were stacked in this order and bonded with the adhesive by the roll-to-roll method so as to obtain a polarizing plate 2. Evaluation results are shown in Table 1 and Table 2. The obtained polarizer was attached to a liquid crystal display so that the film 1A was on the side far from the liquid crystal panel.

Example 3

On both faces of the triacetyl cellulose film (abbreviated as "TAC") with the thickness of 40 μm having water absorption coefficient of 4.4%, photoelastic coefficient of $12 \times 10^{-12}$ $Pa^{-1}$, haze of 0.05%, humidity expansion coefficient of 65 ppm/% RH, refractive index at the wavelength of 380 nm of 1.515 and the refractive index at the wavelength of 780 nm of 1.487, 25 mL/m² of 1.5 mol/L isopropylalcohol solution of potassium hydroxide was applied and dried at 25° C. for 5 seconds. Then, it was washed by running water for 10 seconds and the surface of the film was dried by blowing air of 25° C. On both faces of the surface-treated triacetyl cellulose film, a single-layer film of polymethylmethacrylate resin with water absorption coefficient of 0.3%, photoelastic coefficient of $-6.0 \times 10^{-12}$ $Pa^{-1}$, haze of 0.08%, humidity expansion coefficient of 28 ppm/% RH, tensile elastic modulus of 3.3 GPa, and the thickness of 30 μm was laminated by heat-pressed laminate so as to have a protective film 2A for polarizing plate. The protective film 2A for polarizing plate had moisture permeability of 61 g/(m²·24 h), photoelastic coefficient of $3 \times 10^{-12}$ $Pa^{-1}$, and a difference in humidity expansion coefficient between adjacent layers at 37 ppm/% RH, and its surface was a flat face without linear recess portion or linear projection portion. The triacetyl cellulose layer had distribution of the refractive index n(λ) as shown in FIG. 1, and all the polymethylmethacrylate resin layers had distribution of the refractive index n(λ) as shown in FIG. 1. The polymethylmethacrylate resin layers on both sides had the refractive index at the wavelength 380 nm of 1.512 and the refractive index at the wavelength of 780 nm of 1.488. The value of the formula [1] was 0.002.

An acrylic adhesive was applied to both faces of the polarizer P, and one face of the protective film 2A for polarizing plate and the corona-discharge processed face of the film 1B were faced with the polarizer P, and stacked and bonded by a roll-to-roll method so as to obtain a polarizing plate 3.

FIG. 2 shows distribution of absolute values of a difference between the refractive index n(λ) of the polymethylmethacrylate resin layer and the refractive index n(λ) of the triacetyl cellulose layer. The polymethylmethacrylate resin layer and the triacetyl cellulose layer satisfied the relationship in the formula [2]. FIG. 3 shows distribution of absolute values of a difference between the refractive index n(λ) of the polyvinyl alcohol contained in the polarizer and the refractive index n(λ) of the polymethylmethacrylate resin layer. The polyvinyl alcohol contained in the polarizer and the polymethylmethacrylate resin layer had the value of the formula [4] at 0 and satisfied the relationship in the formula [5]. Evaluation results are shown in Table 1 and Table 2. The obtained polarizing plate was attached to a liquid crystal display so that the film 2A was on the side far from the liquid crystal panel.

Example 4

Production of Antireflection Layer

On both faces of the protective film 1A for polarizing plate, corona discharge processing was applied using a high-frequency transmitter so as to have a protective film 1C for polarizing plate with surface tension of 0.055 N/m.

Next, a composition H for forming a high refractive-index layer was applied on one face of the protective film 1A for polarizing plate using a die coater and it was dried in a drying furnace at 80° C. for 5 minutes so as to have a film. Moreover, ultraviolet was irradiated (integrated ultraviolet level of 300 mJ/cm²) and a high refractive-index layer with the thickness of 5 μm was formed so as to have a laminated film 1D. The refractive index of the high refractive-index layer was 1.62 and the pencil hardness was 4H.

On the high refractive-index layer side of the laminated film 1D, a composition L for forming a low refractive-index layer was applied using a wire bar coater and left to be dried for 1 hour, and the obtained film was heat-treated under an oxygen atmosphere at 120° C. for 10 minutes to form a low refractive-index layer with the thickness of 100 nm (refractive index of 1.36), whereby a protective film 1E for polarizing plate with antireflection layer was obtained.

An acrylic adhesive was applied to both faces of the polarizer P, and a face of the protective film 1E for polarizing plate without the antireflection layer and the corona-discharge processed face of the film 1B were faced with the polarizer P, and stacked and bonded by a roll-to-roll method so as to obtain a polarizing plate 4. Evaluation results are shown in Table 1 and Table 2. The obtained polarizing plate was attached to a liquid crystal display with the film 1E (antireflection layer) on the side far from the liquid crystal panel.

Example 5

Polymethylmethacrylate resin (water absorption coefficient of 0.3%, photoelastic coefficient of $-6.0 \times 10^{-12}$ $Pa^{-1}$, haze of 0.08%, humidity expansion coefficient of 28 ppm/% RH, tensile elastic modulus of 3.3 GPa. Abbreviated as "PMMA") was inputted to a double-flight type uniaxial extruder with a leaf-disk shaped polymer filter with an opening of 10 ppm, and a molten resin was supplied to one of multi-manifold die with a die slip having surface roughness Ra of 0.1 μm at an extruder outlet temperature of 260° C.

On the other hand, polymethylmethacrylate resin (tensile elastic modulus of 2.8 GPa) containing an elastic particle with the number average particle size of 0.4 μm and an ultraviolet absorbing agent (LA31; made by ADEKA Corporation) were mixed so that the concentration of the ultraviolet absorbing agent became 3 weight % so as to have a mixture (water absorption coefficient of 0.3%, photoelastic coefficient of $-4.0 \times 10^{-12}$ $Pa^{-1}$, haze of 0.1%, and humidity expansion coefficient of 30 ppm/% RH. Abbreviated as "R¹-PMMA"). This was inputted to a double-flight type uniaxial extruder with a leaf-disk shaped polymer filter with an opening of 10 μm, and a molten resin was supplied to the other of multi-manifold die with a die slip having surface roughness Ra of 0.1 μm at an extruder outlet temperature of 260° C.

And the polymethylmethacrylate resin in the molten state not containing the elastic particulate and the polymethylmethacrylate resin in the molten state containing the elastic particulate and an ultraviolet absorbing agent were discharged, respectively, from the multi-manifold die at 260° C. and cast to a cooling roll whose temperature was adjusted to 130° C., and then, passed between the cooling rolls whose temperature were adjusted to 50° C. so as to obtain a protective film 3A for polarizing plate with the width of 600 mm and the thickness of 80 μm in a three-layers structure of the PMMA layer (20 μm)/R¹-PMMA layer (40 μm)/PMMA layer (20 μm) by coextrusion molding. The protective film 3A for polarizing plate had moisture permeability of 51 g/(m²·24 h), photoelastic coefficient of $-5 \times 10^{-12}$ Pa$^{-1}$, and a difference in humidity expansion coefficient between adjacent layers at 2 ppm/% RH, and its surface was a flat face without linear recess portion or linear projection portion.

The polymethylmethacrylate resin layer had distribution of the refractive index n(λ) as shown in FIG. 1, and polymethylmethacrylate resin layer containing the elastic particulate and ultraviolet absorbing agent had distribution of the refractive index n(λ) as shown in FIG. 1. The polymethylmethacrylate resin layers on both sides had the refractive index at the wavelength 380 nm of 1.512 and the refractive index at the wavelength of 780 nm of 1.488, while the polymethylmethacrylate resin layer containing the elastic particulate and ultraviolet absorbing agent had the refractive index at the wavelength 380 nm of 1.507 and the refractive index at the wavelength of 780 nm of 1.489. The value of the formula [1] was 0.004.

FIG. 2 shows distribution of absolute values of a difference between the refractive index n(λ) of the polymethylmethacrylate resin layer and the refractive index n(λ) of the polymethylmethacrylate resin layer containing the elastic particulate and ultraviolet absorbing agent. The polymethylmethacrylate resin layer and the polymethylmethacrylate resin layer containing the elastic particulate and ultraviolet absorbing agent satisfied the relationship in the formula [2]. In FIG. 2, since the distribution of absolute values of a difference between the refractive index n(λ) of polymethylmethacrylate resin layer and the refractive index n(λ) of the polymethylmethacrylate resin layer containing the elastic particulate and ultraviolet absorbing agent and the distribution of absolute values of a difference between the refractive index n(λ) of polymethylmethacrylate resin layer and the refractive index n(λ) of the triacetyl cellulose layer are substantially the same, they are displayed while being overlapped.

An acrylic adhesive was applied to both faces of the polarizer P, and a face of the protective film 3A for polarizing plate and the corona-discharge processed face of the film 2B were faced with the polarizer P, and stacked and bonded by a roll-to-roll method so as to obtain a polarizing plate 5. Evaluation results are shown in Table 1 and Table 2. FIG. 3 shows distribution of absolute values of a difference between the refractive index n(λ) of the polyvinyl alcohol contained in the polarizer and the refractive index n(λ) of the polymethylmethacrylate resin layer. The polyvinyl alcohol contained in the polarizer and the polymethylmethacrylate resin layer had the value of the formula [4] at 0 and satisfied the relationship in the formula [5]. The obtained polarizing plate was attached to a liquid crystal display so that the film 3A was on the side far from the liquid crystal panel.

Example 6

Polymethylmethacrylate resin containing an elastic particle (water absorption coefficient of 0.3%, photoelastic coefficient of $-5.0 \times 10^{-12}$ Pa$^{-1}$, haze of 0.1%, humidity expansion coefficient of 30 ppm/% RH, tensile elastic modulus of 2.8 GPa. Abbreviated as "R²-PMMA") was inputted to a double-flight type uniaxial extruder with a leaf-disk shaped polymer filter with an opening of 10 μm, and a molten resin was supplied to one of multi-manifold die with a die lip having surface roughness Ra of 0.1 μm at an extruder outlet temperature of 260° C.

A protective film 3B for polarizing plate with the width of 600 mm and the thickness of 40 μm in a three-layers structure of the R²-PMMA-layer (10 μm)/R¹-PMMA layer (20 μm)/R 2-PMMA layer (10 μm) by coextrusion molding was obtained by the same manner as Example 5 except that R²-PMMA was used instead of PMMA in Example 5. The protective film 3B for polarizing plate had moisture permeability of 105 g/(m²·24 h), photoelastic coefficient of $-4.5 \times 10^{-12}$ Pa$^{-1}$, and a difference in humidity expansion coefficient between adjacent layers of 2 ppm/% RH, and its surface was a flat face without linear recess portion or linear projection portion.

R²-PMMA and R¹-PMMA had substantially the same distribution of n(λ) and satisfied the formula [2]. The R²-PMMA layer had the refractive index at the wavelength of 380 nm of 1.507 and the refractive index at the wavelength of 780 nm of 1.489, and the R¹-PMMA layer had the refractive index at the wavelength of 380 nm of 1.507 and the refractive index at the wavelength of 780 nm of 1.489. The value of the formula [1] was 0.

On one face of the triacetyl cellulose film with the thickness of 80 μm, 25 mL/m² of 1.5 mol/L isopropylalcohol solution of potassium hydroxide was applied and dried at 25° C. for 5 seconds. Then, it was washed by running water for 10 seconds, the surface of the film was dried by blowing air of 25° C. finally, and only one surface of the triacetyl cellulose film was saponified so as to obtain a film 4A.

An acrylic adhesive was applied to both faces of the polarizer P, and a face of the protective film 3B for polarizing plate and the film 4A were faced with the polarizer P, and stacked and bonded by a roll-to-roll method so as to obtain a polarizing plate 6. Evaluation results are shown in Table 1 and Table 2. The value of the formula [4] was 0.006 and the relation in the formula [5] was satisfied. The obtained polarizing plate was attached to a liquid crystal display with the film 4A on the side far from the liquid crystal panel.

Comparative Example 1

A protective film 5A for polarizing plate in a three-layer structure was fabricated by the same manner as Example 1 except that polycarbonate resin (water absorption coefficient of 0.2%, photoelastic coefficient of $70 \times 10^{-12}$ Pa$^{-1}$, haze of 0.08%, humidity expansion coefficient of 32 ppm/% RH, tensile elastic modulus of 2.5 GPa. Abbreviated as "PC") was used instead of the alicyclic olefin polymer in Example 1. The protective film 5A for polarizing plate had moisture permeability of 22 g/(m²·24 h), photoelastic coefficient of $27 \times 10^{-12}$ Pa$^{-1}$, and a difference in humidity expansion coefficient between adjacent layers at 13 ppm/% RH, and its surface was a flat face without linear recess portion or linear projection portion. The polymethylmethacrylate layer had distribution of the refractive index n(λ) shown in FIG. 1, and the polycarbonate resin layer had distribution of the refractive index n (λ) shown in FIG. 1. A polarizing plate 7 was obtained by the same manner as Example 1 except that the film 5A was used instead of the film 1A.

FIG. 2 shows distribution of absolute values of a difference between the refractive index n(λ) of the polymethylmethacrylate resin layer and the refractive index n(λ) of the polycarbonate resin layer. The polymethylmethacrylate resin layer and the polycarbonate resin layer did not satisfy the relation in the formula [2]. In addition, FIG. 3 shows distribution of absolute values of a difference between the refractive index n(λ) of the polyvinyl alcohol contained in the polarizer and the refractive index n(λ) of the polymethylmethacrylate resin layer. The polycarbonate resin layer had the refractive index at the wavelength of 380 nm of 1.608 and the refractive index at the wavelength of 780 nm of 1.556, and the polymethylmethacrylate resin layer on both sides had the refractive index at the wavelength of 380 nm of 1.512 and the refractive index at the wavelength of 780 nm of 1.488. The value of the formula [1] was 0.028, and the value of the formula [4] was 0. Evaluation results are shown in Table 1 and Table 2. The obtained polarizing plate was attached to a liquid crystal display with the film 5A on the side far from the liquid crystal panel.

Comparative Example 2

A protective film 6A for polarizing plate in a three-layer structure was fabricated by the same manner as Example 3 except that polyethylene terephthalate film with the refractive index at the wavelength 380 nm of 1.715 and the refractive index at the wavelength 780 nm of 1.631 (water absorption coefficient of 0.5%, photoelastic coefficient of $120 \times 10^{-12}$ $Pa^{-1}$, haze of 0.08%, humidity expansion coefficient of 12 ppm/% RH, tensile elastic modulus of 5 GPa, Abbreviated as "PET") was used instead of triacetyl cellulose film in Example 3. Moreover, a polarizing plate 8 was obtained by the same manner as example 3 except that the film 6A replaced the film 2A. The protective film 6A for polarizing plate had moisture permeability of 54 g/($m^2 \cdot 24$ h), photoelastic coefficient of $50 \times 10^{-12}$ $Pa^{-1}$, and a difference in humidity expansion coefficient between adjacent layers of 16 ppm/% RH. The surface of the protective film 6A for polarizing plate was a surface on which a linear recess portion with the depth or the height of 20 nm or more and 50 nm or less, and the width in the range of 500 nm or more and less than 800 nm were formed. The polymethylmethacrylate resin layer had distribution of the refractive index n(λ) shown in FIG. 1 and the polyethylene terephthalate resin layer had distribution of the refractive index n(λ) shown in FIG. 1.

FIG. 2 shows distribution of absolute values of a difference between the refractive index n(λ) of the polymethylmethacrylate resin layer and the refractive index n(λ) of the polyethylene terephthalate resin layer. The polymethylmethacrylate resin layer and the polyethylene terephthalate resin layer did not satisfy the relationship in the formula [2]. The value of the formula [1] was 0.060, and the value of the formula [4] was 0. Evaluation results are shown in Table 1 and Table 2. The obtained polarizing plate was attached to a liquid crystal display with the film 6A on the side far from the liquid crystal panel.

Comparative Example 3

A polarizing plate 9 was obtained by the same manner as Example 1 except that a film with the thickness of 80 μm obtained by single-layer extrusion molding of polymethylmethacrylate resin (noted as PMMA in Tables and Figures) was used as a protective film 7A for polarizing plate instead of the protective film 1A for polarizing plate in Example 1. The protective film 7A for polarizing plate had moisture permeability of 40 g/($m^2 \cdot 24$ h) and photoelastic coefficient of $-6 \times 10^{-12}$ $Pa^{-1}$, and the surface was a surface on which a linear recess portion with the depth or the height of 20 nm or more and 50 nm or less, and the width in the range of 500 nm or more and less than 800 nm were formed.

FIG. 1 shows the refractive index n(λ) of the single-layer film layer of polymethylmethacrylate. Evaluation results are shown in Table 1 and Table 2. The obtained polarizing plate was attached to a liquid crystal display with the film 7A on the side far from the liquid crystal panel.

[Table 1]

TABLE 1

| film # | 1A | 2A | 3A | 3B | 5A | 6A | 7A |
|---|---|---|---|---|---|---|---|
| | PMMA COP PMMA | PMMA TAC PMMA | PMMA $R^1$-PMMA PMMA | $R^2$-PMMA $R^1$-PMMA $R^2$-PMMA | PMMA PC PMMA | PMMA PET PMMA | PMMA |
| Moisture permeability [g/$m^2 \cdot$ 24 h] | 3.5 | 61 | 51 | 105 | 22 | 54 | 40 |
| Photoelastic coefficient [$\times 10^{-12} Pa^{-1}$] | 1 | 3 | −5 | −4.5 | 27 | 50 | −6 |
| Humidity expansion coefficient difference [ppm/% RH] | 27 | 37 | 2 | 2 | 13 | 16 | — |
| Linear recess and projection | ◎ | ◎ | ◎ | ◎ | ◎ | ○ | ○ |

(Water Absorption Coefficient)

This was measured at 23° C. for 24 hours in compliance with JIS K7209.

(Haze)

This was measured in compliance with JIS K7105 by "Turbid meter NDH-300A" produced by Nippon Denshoku Industries Co. Ltd. The 5 measurements were conducted and their arithmetic average value was made as a representative value of haze.

(Tensile Elastic Modulus)

A thermoplastic resin was molded to obtain a single-layer film with the thickness of 100 μm, this was cut out to the size of 1 cm×25 cm as a test piece, which was measured under the condition of a tensile velocity of 25 mm/min using a tensile tester (TENSILON UTM-10T-PL, by ORIENTEC Co., LTD. (former name is TOYO Baldwin Co. Ltd.)) based on ASTM D882. The 5 measurements were conducted and their arithmetic average value was made as a representative value of tensile elastic modulus.

(Refractive Index n(λ) of Thermoplastic Resin Layer)

A thermoplastic resin was molded to obtain a single-layer film with the thickness of 100 μm, and this was cut out to the size of 1 cm×25 cm as a test piece. At one arbitrary point in the center part of this test piece, refractive indexes at wavelengths of 633 nm, 407 nm and 532 nm were measured under the condition of a temperature of 20±2° C. and humidity of 60±5% using a prism coupler (by Metricon corporation, model 2010), and refractive indexes at 380 nm and 780 nm were calculated from the measured refractive indexes by Caucy's dispersion formula.

(Refractive Index of Antireflection Layer)

Using fast spectral ellipsometer (by J. A. Woollam, M-2000 U), a spectrum in a wavelength region of 400 to 1000 nm was measured at incident angles of 55, 60, and 65 degrees under the condition of a temperature of 20±2° C. and humidity of 60±5%, and the refractive index was measured from the measurement result.

(Moisture Permeability)

With a test condition that a thermoplastic resin was molded to obtain a single-layer film with the thickness of 100 μm, and this was left under an environment of a temperature at 40° C. and at 92% R.H for 24 hours, measurement was made using a method conforming to the cup method according to JIS Z0208. The unit of the moisture permeability is $g/(m^2 \cdot 24\ h)$.

(Photoelastic Coefficient)

Under a condition of a temperature at 20±2° C. and humidity at 60±5%, measurement was made using a photoelastic coefficient measuring device (by Uniopt Corporation, Ltd., PHEL-20A).

(Humidity Expansion Coefficient)

A film sample was cut in accordance with a test piece type 1B described in JIS K7127 so that the width direction became a measuring direction and set at a tensile tester with high-temperature constant-humidity bath (by Instron), a nitrogen atmosphere with humidity at 35% RH and 23° C. or a nitrogen atmosphere with humidity at 70% RH and 23° C. was kept, the length of each sample at that time was measured, and the humidity expansion coefficient was calculated by the following formula. The measuring direction was a longitudinal direction of a cut-out sample, measurement was made five times, and their average value was made as the humidity expansion coefficient.

$$\text{Humidity expansion coefficient} = (L_{70} - L_{35})/(L_{35} \times \Delta H)$$

where, $L_{35}$: Sample length at 35% RH (mm)
$L_{70}$: Sample length at 70% RH (mm)
$\Delta H$: 35 (=70−35) % RH Table 1 shows a difference between the humidity expansion coefficient of the intermediate layer and the humidity expansion coefficient of the layers on its both sides.

(Linear Recess and Projection on Film Surface)

By the above-mentioned method, the depth of the linear recess portion, the height of the linear projection portion, and their widths were measured. The maximum values of the obtained linear recess portion depth and the linear projection portion height, the width of the linear recess portion and the width of the linear projection portion indicating the maximum value were made as the linear recess portion depth and the linear projection portion height and their widths of the film and evaluated based on the following standards.

⊚: The linear recess portion depth or the linear projection portion height was less than 20 nm and the width was 800 nm or more.

○: The linear recess portion depth or the linear projection portion height was 20 nm or more and 50 nm or less and the width was 500 nm or more and less than 800 nm.

x: The linear recess portion depth or the linear projection portion height exceeded 50 nm and the width was less than 500 nm.

(Retardation)

Retardation was measured under the condition of a temperature at 20±2° C. and humidity at 60±5% using automatic birefringence measurement (by Oji Scientific Instruments, KOBRA21-ADH) at one arbitrary point in the center part of a film.

[Table 2]

TABLE 2

|  | Ex. | | | | | | Comp. Ex. | | |
| --- | --- | --- | --- | --- | --- | --- | --- | --- | --- |
|  | 1 | 2 | 3 | 4 | 5 | 6 | 1 | 2 | 3 |
| Polarizing plate | 1 | 2 | 3 | 4 | 5 | 6 | 7 | 8 | 9 |
| Protective film | 1A | 1A | 2A | 1E | 3A | 4A | 5A | 6A | 7A |
| Polarizer | PVA | PVA | PVA | PVA | PVA | PVA | PVA | PVA | PVA |
| Protective film | 1B | 2B | 1B | 1B | 2B | 3B | 1B | 1B | 1B |
| Interference fringe | ○ | ○ | ⊚ | ⊚ | ⊚ | ⊚ | Δ | X | ⊚ |
| Pencil hardness | 2H | 2H | 2H | 4H | 2H | H | 2H | 3H | 4H |
| Reflectivity | 4 | 4 | 4 | 0.6 | 4 | 4 | 4 | 4 | 4 |
| Light leakage degree | ○ | ○ | ○ | ○ | ○ | ○ | ○ | X | ○ |
| Polarization change | ○ | ○ | ○ | ○ | ○ | ○ | ○ | ○ | ○ |
| Lamination strength | ○ | ○ | ○ | ○ | ○ | ○ | ○ | ○ | ○ |
| Flexibility | ○ | ○ | ○ | ○ | ○ | ○ | ○ | ○ | X |
| Color reproductivity | ○ | ○ | ○ | ○ | ○ | ○ | X | X | ○ |
| Visibility | ○ | ○ | ○ | ○ | ○ | ○ | X | X | ○ |
| Contrast | 300 | 300 | 280 | 350 | 300 | 300 | 200 | 150 | 300 |

(Observation of Interference Fringes)

The protective film for polarizing plate was placed on a black cloth such as a blackout curtain not transmitting light and lighted by a three-wavelength fluorescent light (National: FL20SS·ENW/18), and the surface of the protective film for polarizing plate was visually observed and evaluated based on the following standards:

⊚: No interference fringe was found.
○: Slight interference fringe was found.
Δ: Interference fringes were conspicuous.
x: Interference fringes were conspicuous and caused glaring.

(Pencil Hardness)

In compliance with JIS K5600-5-4 except that the test load was 500 g, a pencil inclined at an angle of 45 degrees and applied with a load of 500 g was used to scratch the surface of the protective film for polarizing plate (visible side) for approximately 5 mm and the scratch degree was checked.

(Reflectivity)

A black vinyl tape No. 21 (by Nitto Denko) was affixed to one face of the protective film for polarizing plate (a face to be bonded to the polarizer), a reflectance spectrum at an incident angle of 5° on the other face of the protective film for polarizing plate (visible side) was measured using a spectrophotometer (by JASCO Corporation: "Ultraviolet-Visible-Near-infrared Spectrophotometer V-570") so as to determine a reflectance (%) at the wavelength of 550 nm.

(Light Leakage Degree)

Figure 4:
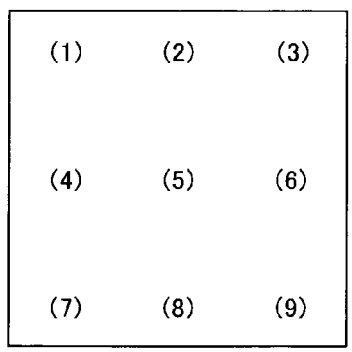
FIG. 4 is a diagram illustrating measurement points of polarization degree and light transmittance in Examples and Comparative Examples.

Two polarizing plates for test were crossed-nicols arranged so that the protective films B were opposed to each other, light transmittance at 9 locations shown in FIG. 4 were measured, and the measurement values were assigned to the following formula so as to calculate the light leakage degree.

$$\text{Light leakage degree}=(T_2+T_4-T_6+T_8)/4)/((T_1+T_3+T_5+T_7+T_9)/5)$$

$T_x$ represents light transmittance at a measurement point (x), and positions from the end portion by 10 mm were set as measurement points of (1), (2), (3), (4), (6), (7), (8), and (9). For the point (5), a measurement point was an intersection of diagonal lines of the polarizing plate for test.

○: Light leakage degree was 2 or less.
x: Light leakage degree was more than 2.

(Fluctuation of Polarization Degree)

The polarizing plate was cut into the size of a 10-inch square and bonded to one face of a glass plate with the face of the protective film B of the polarizing plate faced with the glass plate side through a pressure-sensitive adhesive so as to fabricate a polarizing plate for test. This polarizing plate for test was left in a constant-temperature bath with a temperature of 60° C. and a humidity of 90% for 500 hours, and a fluctuation band of the polarization degree at an intersection of diagonal lines (position of (5) in the figure) of the polarizing plate for test was measured before and after being left in the high temperature and high humidity condition.

○: A fluctuation band of polarization degree was 0.5 or less.
x: A fluctuation band of polarization degree was more than 0.5.

(Lamination Strength)

An operation to leave a polarizing plate in a constant-temperature constant-humidity chamber of 80° C. and 95% RH for 24 hours, and then, in a constant-temperature constant-humidity chamber of 20° C. and 40% RH for 24 hours was repeated twenty times. The lamination states between each layers of the protective film and between the polarizer and the protective film were visually observed and evaluated with x: if there was a portion separated for the length not shorter than 1 mm from the end of the polarizing plate and appearing white or
○: when the length was shorter than 1 mm.

(Flexibility of Polarizing Plate)

A polarizing plate was punched into a film piece of 1 cm×5 cm. This film piece was wrapped around a steel rod of 3 mmΦ and tested to see if the wrapped film piece was broken at the rod or not. The test was conducted ten times in total, and the flexibility was represented by the number of times of not being broken based on the following index.

○: The number of broken film pieces was 1 or less.
x: The number of broken film pieces was 2 or more.

(Color Reproductivity)

The above re-assembled liquid crystal TV was installed under an environment of ambient brightness of 500 lux and the display screen was visually observed when the screen display was set in black and evaluated with the following standards.

○: Color of display screen was black.
x: Color of display screen was blue.

(Visibility)

A liquid crystal display panel was removed from a commercial liquid crystal TV (by Sharp corporation, LC-13C5-S), a polarizing plate on the visible side was separated from a liquid crystal cell in the liquid crystal display panel, the polarizing plate obtained by the present example or comparative example was bonded to the liquid crystal cell instead so that the protective film A for polarizing plate was faced with the visible side, the liquid crystal TV was re-assembled, and visual quality of the liquid crystal TV display was evaluated with the following standards.

○: Workers would not feel uncomfortable even after use for a long time (1 to 2 hours, for example)
x: Workers would feel uncomfortable after use for a long time.

(Contrast)

A liquid crystal display panel was removed from a commercial liquid crystal TV, and instead of a polarizing plate arranged on the visible side, the polarizing plate fabricated in the Examples and Comparative example was assembled (so that the protective film A was on the visible side) and the liquid crystal display was re-assembled.

At dark display mode and bright display mode of the re-assembled liquid crystal display, brightness was measured using a color brightness meter (by Topcon corporation, color brightness meter BM-7) from an angle slanted at 5° to the front face. A ratio between the brightness of the bright display mode and the brightness of the dark display mode (=brightness of bright display mode/brightness of dark display mode) was calculated, which was made as contrast (CR). The larger is the contrast, the more excellent is the visibility.

From the result in Table 2, the following is known. As shown in Examples, the thermoplastic resin layer constituting the protective film with the relationship in the formula [1] is excellent in any of color reproductivity, interference fringes, visibility and the like. On the contrary, as shown in the Comparative examples, those without the relationship of the formula [1] are poor in color reproductivity, interference fringes, and visibility.

The invention claimed is:

1. A protective film for a polarizing plate comprising k layers (k is an integer of 2 or more) of thermoplastic resin laminated,
which is obtained by coextrusion,
wherein at least one of the thermoplastic resin layers is a layer comprising acrylic resin, wherein refractive index $n_i(380)$ at the wavelength of 380 nm and refractive index $n_i(780)$ at the wavelength of 780 nm in the i th thermoplastic resin layer as well as refractive index $n_{i+1}(380)$ at the wavelength of 380 nm and refractive index $n_{i+1}(780)$ at the wavelength of 780 nm in the i+1 th thermoplastic resin layer have a relationship in Formula [1]:

$$||n_i(380)-n_{i+1}(380)|-|n_i(780)-n_{i+1}(780)|| \leq 0.02$$

(where, i is an integer from 1 to k−1)  Formula [1].

2. The protective film for the polarizing plate according to claim 1, wherein refractive index $n_i(\lambda)$ at a wavelength $\lambda$ in the range from 380 to 780 nm in the i th thermoplastic resin layer and refractive index $n_{i+1}(\lambda)$ at a wavelength $\lambda$ in the range of 380 to 780 nm in the i+1 th thermoplastic resin layer have the relationship in Formula [2] and the absolute value of photoelastic coefficient is $10 \times 10^{-12}$ $Pa^{-1}$ or less:

$$|n_i(\lambda)-n_{i+1}(\lambda)| \leq 0.05$$

(where, i is an integer of 1 to k−1)  Formula [2].

3. The protective film for the polarizing plate according to claim 1, wherein every one of the k layers of thermoplastic resin is made of a material with a haze of 0.5% or less and containing an amorphous thermoplastic resin, and the humidity expansion coefficient $\beta_i$ of the i th thermoplastic resin layer and the humidity expansion coefficient $\beta_{i+1}$ of the i+1 th thermoplastic resin layer have the relationship in Formula [3]:

$$|\beta_i-\beta_{i+1}| \leq 40 \text{ ppm/\%RH} \quad \text{Formula [3]}.$$

4. The protective film for the polarizing plate according to claim 1, wherein at least one of the k layers of thermoplastic resin is a thermoplastic resin layer with the water absorption coefficient of 0.5% or less.

5. The protective film for the polarizing plate according to claim 1, which further comprises an antireflection layer laminated directly or indirectly on the surface of the kth thermoplastic resin layer.

6. A polarizing plate comprising a laminate of the protective film for polarizing plate according to claim 1 and a polarizer.

7. The polarizing plate according to claim 6, wherein the polarizer contains polyvinyl alcohol;
said protective film for polarizing plate is laminated on the polarizer facing to the first thermoplastic resin layer therein; and
refractive index $n_1(380)$ at the wavelength of 380 nm and refractive index $n_1(780)$ at the wavelength of 780 nm in the first thermoplastic resin layer as well as refractive index $n_b(380)$ at the wavelength of 380 nm and refractive index $n_b(780)$ at the wavelength of 780 nm in the polyvinyl alcohol have the relationship in Formula [4]:

$$||n_1(380)-n_b(380)|-|n_1(780)-n_b(780)|| \leq 0.02 \quad \text{Formula [4]}.$$

8. The polarizing plate according to claim 6, wherein refractive index $n_1(\lambda)$ at the wavelength $\lambda$ in the range of 380 to 780 nm in the first thermoplastic resin layer in said protective film for the polarizing plate and refractive index $n_b(\lambda)$ at the wavelength $\lambda$ in the range of 380 to 780 nm in the polyvinyl alcohol contained in said polarizer satisfy the relationship in Formula [5]:

$$|n_1(\lambda)-n_b(\lambda)| \leq 0.04 \quad \text{Formula [5]}.$$

9. The polarizing plate according to claim 6, wherein there is no linear recess portion with a depth of 50 nm or more and a width of 500 nm or less on the surface of the k th thermoplastic resin layer in said protective film for the polarizing plate.

10. The polarizing plate according to claim 6, wherein there is no linear projection portion with a height of 50 nm or more and a width of 500 nm or less on the surface of the k th thermoplastic resin layer in said protective film for the polarizing plate.

11. A liquid crystal display comprising the polarizing plate according to claim 6 and a liquid crystal panel.

12. The liquid crystal display according to claim 11, wherein said polarizing plate is arranged on the observer side of a liquid crystal panel.

\* \* \* \* \*